(12) United States Patent
Baker et al.

(10) Patent No.: US 6,328,165 B1
(45) Date of Patent: Dec. 11, 2001

(54) MARINE HARVESTING METHODS AND APPARATUS

(75) Inventors: Garyn Philip Baker, Salt Lake City; Gary Lynn Baker, West Warren, both of UT (US)

(73) Assignee: International Aquaculture Technologies, Brigham City, UT (US)

(*) Notice: Subject to any disclaimer, the term of this patent is extended or adjusted under 35 U.S.C. 154(b) by 0 days.

(21) Appl. No.: 08/525,365

(22) Filed: Sep. 7, 1995

Related U.S. Application Data

(63) Continuation-in-part of application No. 08/489,809, filed on Jun. 13, 1995, now abandoned.

(51) Int. Cl.[7] .................................................. B07B 1/00
(52) U.S. Cl. ........................ 209/235; 209/272; 43/6.5; 43/4; 43/4.5; 56/9; 56/8
(58) Field of Search ................. 43/6.5, 4, 4.5; 56/9, 8; 209/272, 235, 254, 307, 308, 380, 270, 288; 210/776, 923, 242.1, 242.3, 384, 335, 160, 161, 217, 216, 400, 402

(56) References Cited

U.S. PATENT DOCUMENTS

| | | |
|---|---|---|
| 1,717,835 | 6/1929 | Calhoun . |
| 3,768,193 | 10/1973 | London ................................. 43/6.5 |
| 3,913,254 | 10/1975 | Puretic .................................. 43/6.5 |
| 4,663,879 | 5/1987 | Bergeron, Jr. ......................... 43/4.5 |
| 4,944,108 | 7/1990 | George et al. ........................ 43/6.5 |
| 4,998,369 | 3/1991 | Lamon ................................. 43/6.5 |
| 5,042,187 | 8/1991 | Bentzley .............................. 43/6.5 |
| 5,457,908 | * 10/1995 | Sanders ................................ 43/6.5 |
| 5,839,216 | * 11/1998 | Baker et al. .......................... 43/6.5 |

* cited by examiner

Primary Examiner—David H. Bollinger
(74) Attorney, Agent, or Firm—Madson & Metcalf

(57) ABSTRACT

Methods and apparatus are provided for harvesting aquaculture from a body of water. The apparatus includes a continuous belt which is partially submerged in the water. A flow of water is created which forces aquaculture against the moving belt and the belt then lifts the aquaculture into the vessel. The aquaculture is then deposited on a moving belt which initially filters out a selected species from the aquaculture and deposits the selected species in a settling compartment. The selected species is then pumped from the settling compartment to a second compartment. The selected species may then be passed through another filtering system comprised of a tube with a formed wire spirally wound thereabout. The spacing between the wound wire may be varied so that only the selected species having a specific size may pass therethrough. As a result, only filtered selected species need be transported to shore thereby providing for a more efficient system and allowing the ship to transport more of the selected species and less detritus.

30 Claims, 7 Drawing Sheets

MARINE HARVESTING METHODS AND APPARATUS

RELATED TECHNOLOGY

The present application is a continuation in part of U.S. patent application Ser. No. 08/489,809 filed Jun. 13, 1995 now abandoned in the names of Garyn Philip Baker and Gary Lynn Baker for Marine Harvesting Methods and Apparatus. For purposes of disclosure, the above-identified application is hereby specifically incorporated by reference.

BACKGROUND

1. Field of the Invention

This invention relates generally to the harvesting of aquaculture from bodies of water, but more specifically to methods and apparatus for the harvesting of the types of aquaculture available near the surface of the water, for example brine shrimp and brine shrimp roe, jelly fish, kelp, algae, and other creatures that live within the upper ten feet below the surface of the body of water. Although some preferred embodiments presented herein are directed to the harvesting of roe and small invertebrates, it will be appreciated that this technique can also be used for harvesting other types of plants and animals.

2. Background Art

Harvesting aquaculture from bodies of water has been a significant source of nutrition for mankind throughout history. Although advancements in watercraft have allowed vessels to become faster and larger, increases in the amount of fauna harvested generally focus on enlarging age-old methods. For example, although fishing line and nets have been used for centuries, it has been only recently that technology has allowed the use of miles-long drift nets pulled behind huge ships. Although these changes in the scope of harvesting techniques have resulted in larger yields, they have not significantly advanced the sophistication of the technology used in harvesting aquaculture.

Although larger nets can be utilized for harvesting of fish, the harvesting of smaller species which tend to live near the surface is usually accomplished through the use of small hand nets having small openings. The small size of the openings prevents escape of the aquaculture but also prevents the rapid removal of water. These harvesting techniques therefore often require the use of cranes or other machinery to enable lifting of the fine meshed nets or bags out of the water and to handle the bags once they are aboard the ship.

After the bags of the aquaculture are loaded on the ship, the ship is typically taken to shore where the aquaculture is processed and stored for land transport. The disadvantage to this method is that, in addition to the harvested aquaculture, an abundance of water, unwanted species, and detritus is also collected and hauled to shore. Large and expensive facilities must then be constructed to hold the collected materials and to separate the selected species from the unwanted materials. Due to the large amount of unwanted material collected, the separation process can be both slow and costly.

In an attempt to limit the costly land processing, attempts have been made to at least partially separate out the selected species of aquaculture on the ship. In the case of brine ship roe, this has typically been accomplished by placing the captured water and aquaculture in a settling tank. Since the roe typically has the highest buoyancy, the roe will float to the surface of the tank where it is separated from the rest of the material.

The above process, however, has several shortcomings. For example, the separation of the shrimp roe from the rest of the aquaculture is often not absolute. This is especially true where there is a large concentration of other types of aquaculture in the water or when the harvesting is being performed under rough water conditions. As a result, significant land processing is still required.

Furthermore, the process does not work where the selected species to be harvested are not the species that float on the top surface or where it is desired to collect a plurality of different species.

In addition, collection of the selected species still requires the processing of a large amount of water. This processing requires extra time and energy.

OBJECTS AND BRIEF SUMMARY OF THE INVENTION

It is therefore, an object of the present invention to provide improved methods and apparatus for harvesting aquaculture from a body of water.

It is yet another object of the present invention to provide improved methods and apparatus for harvesting a selected species of aquaculture from among several species initially acquired during the harvesting operation.

Another object of the present invention is to provide methods and apparatus for harvesting aquaculture which do not require the lifting of heavy containers.

It is another object of the present invention to provide methods and apparatus for harvesting aquaculture in which the water is substantially separated from the aquaculture during the initial harvesting process.

Another object of the present invention is to provide methods and apparatus for substantially separating a plurality of different selected species from the aquaculture during the initial harvesting of the aquaculture.

Yet another object of the present invention is to provide methods and apparatus for separating a selected species from the aquaculture wherein the methods and apparatus can be used during the harvesting or during dry land processing.

It is another object of the present invention to provide method and apparatus for separating the selected species from the remaining aquaculture wherein the separating process is continuous to limit time and cost.

It is yet another object of the present invention to provide methods and apparatus for harvesting aquaculture which can be rapidly deployed to the site for harvesting.

Finally, it is a further object of the present invention to provide methods and apparatus for harvesting aquaculture which allow for a more rapid harvesting to occur.

Additional objects and advantages of the invention will be set forth in the description which follows, and in part may be derived from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, methods and apparatus are provided for harvesting aquaculture utilizing a moving belt-type skimmer which is placed in the water from a ship. The belt is constructed of a material having a pore size and other characteristics which allow the selected species to be lifted from the water and carried up the belt and deposited in the ship. A boom is placed on the surface of the water and extends to a depth there below to initially accumulate the harvest and direct the harvest onto the moving belt. The harvest may be adhered to the belt either by the motion of the ship through the water, or by the use of propulsion induced flow such as that taught in U.S. Pat. No. 3,992,292, which is hereby incorporated by reference. By using the belt, the aquaculture is substantially separated from the water.

After the aquaculture has been moved up the belt and the belt has revolved around its highest elevation and has started to return to the lower elevation, a spray bar placed between the ascending portion of the belt and the descending portion sprays in a downward direction through the descending portion of the belt thereby removing the harvest from the outer surface of the belt and depositing the harvest in a holding tank located below the spray bar. The holding tank has an independent supply of water that allows the aquaculture to begin to settle and separate within the holding tank.

In one embodiment, a second conveyor belt is positioned to receive the aquaculture from the loading belt. The second belt has a plurality of pores extending therethrough. The pores have a diameter slightly larger than the selected species so that the selected species fall through the pores and into the holding tank. The remaining portion of the aquaculture stays on the second belt and is eventually removed as waste or processed for additional species.

In an alternative embodiment, it is envisioned that a table having comparably sized pores could replace the second conveyor belt. The table could selectively vibrate to help filter the selected species through the pores. By using a combination of tables or conveyor belts having a plurality of different sized pores, it is envisioned that a variety of individual species having different sizes could be collected and deposited into separated holding tanks.

Another embodiment utilizes pore sizes smaller than the selected species and allows unwanted material smaller than the selected species to fan through the belt. This embodiment is used in conjunction with a belt having larger holes so that the material both larger and smaller than the selected species is removed.

Depending on the selected species to be harvested, the contents of the holding tank can either be allowed to settle within the holding tank or can be pumped to separate compartments within the ship for settling. A desired strata within the settled components of the compartment can later be removed, or the contents can be immediately skimmed and the detritus pumped off the ship. This is important as some of the skimmed material will not survive long out of water. The present invention not only allows for efficient harvesting, but also allows unwanted species to be deposited back into the environment from which they were taken. Because the entire operation is accomplished so quickly any damage to the unwanted species is minimized and their immediate release back into their preferred environment further reduces any shock from release.

It will be appreciated that the portion of the present invention utilizing the moving belt can be utilized with a ship without compartments. In that situation, the entire contents of the harvest are shipped to land. It is preferred, however, to utilize a ship that has several compartments built therein.

Utilizing a ship having settling compartments, the harvest may be allowed to settle in some compartments and the desired strata may then be removed and pumped into another compartment resulting in a cleaner catch. The remainder can then be pumped overboard and the compertment can be reused. In this manner, only the catch need be shipped back to shore and the ship can remain on the harvesting grounds longer before reaching the capacity of the ship. This not only results in a more economical harvesting process, but also eliminates some of the processing steps at the processing plant on the shore, along with the benefits previously discussed regarding the lessened impact on unwanted harvested species.

When harvesting very small aquaculture such as brine shrimp or brine shrimp roe, yet another aspect of the present invention may be utilized to further process the catch in situ. For example, since brine shrimp roe float, the harvest being removed by the spray bar off of the moving belt can be placed in a settling compartment and only the materials floating in that compartment may be pumped into a separate compartment. It will be appreciated that for other species, it may be more desirable to pump the lower portion of the compartment or pump a portion of the compartment in between the upper and lower strata.

After the brine shrimp roe has been removed from the compartment, the remainder of the material in the compartment can be pumped overboard. The brine shrimp may then be pumped over to another compartment or may be pumped to a roe separator.

In yet a further aspect of the present invention, a roe separator is provided comprising two thin cylinders which are submerged into a compartment into which the brine shrimp roe are pumped. The cylinders are comprised of longitudinal rods to which stainless steel fins are welded. The fins are created by spirally winding a formed wire around the longitudinal rods. The spaces between the formed wires are carefully controlled so that only the desired species may pass between the fins to enter the hollow center of the tube. For example, when used with brine shrimp roe, the roe separators utilize fins which are spaced apart only enough for brine shrimp roe to pass therethrough.

After the roe separators are rotated within this submerged compartment for a time, the lower pressure within the hollow roe separator cylinders cause the brine shrimp roe to enter the cylinders through the fins and to be carried to yet another compartment. Any material in the shrimp roe separator compartment which is too large to pass through the fins is then pumped overboard. This is especially useful when harvesting brine shrimp roe in shallow or muddy waters wherein mud and adult brine shrimp may be inadvertently harvested in addition to the roe.

Once the roe has passed through the roe separator, the roe then is pumped into a final compartment for shipping. By utilizing each of the aforementioned processing steps, nearly all of the processing which would normally take place on land can be accomplished in situ resulting the transport of only the pure harvest. The aforementioned methods and apparatus do not require the lifting of any nets or sacks and thereby greatly reduces the amount of effort that needs to be expended in harvesting. Yet another advantage of the aforementioned apparatus is that the harvest may be pumped directly from the ship to a transport truck thereby completely eliminating the need for a processing plant.

Although brine shrimp roe has been used as an example to demonstrate the advantages of the invention, it will be appreciated that many other species may also be harvested utilizing this technique with only minor alterations to the equipment. For example, the spacing of the fins on the roe separator can be increased to accommodate a larger species.

It will also be appreciated that as the size of the species increases, it might prove advantageous to reverse the role of the separator and allow any detritus smaller than the catch to enter the separator and to be pumped overboard while removing the contents of the compartment which is too large to pass through the separator. The catch remaining in the compartment could then be pumped into a compartment of the ship. Similarly, the shape of the boom and the speed of the belt and the material used on the belt may also be altered within the teachings of the present invention to provide for advantages in harvesting selected species.

The present invention also envisions that the above described apparatus and methods can be incorporated into an on-shore facility. Such facilities can be used for quickly and economically processing captured quantities of water to separate out selected species.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which.

DETAILED DESCRIPTION OF THE PREFERRED EMBODIMENTS

Figure 1A:
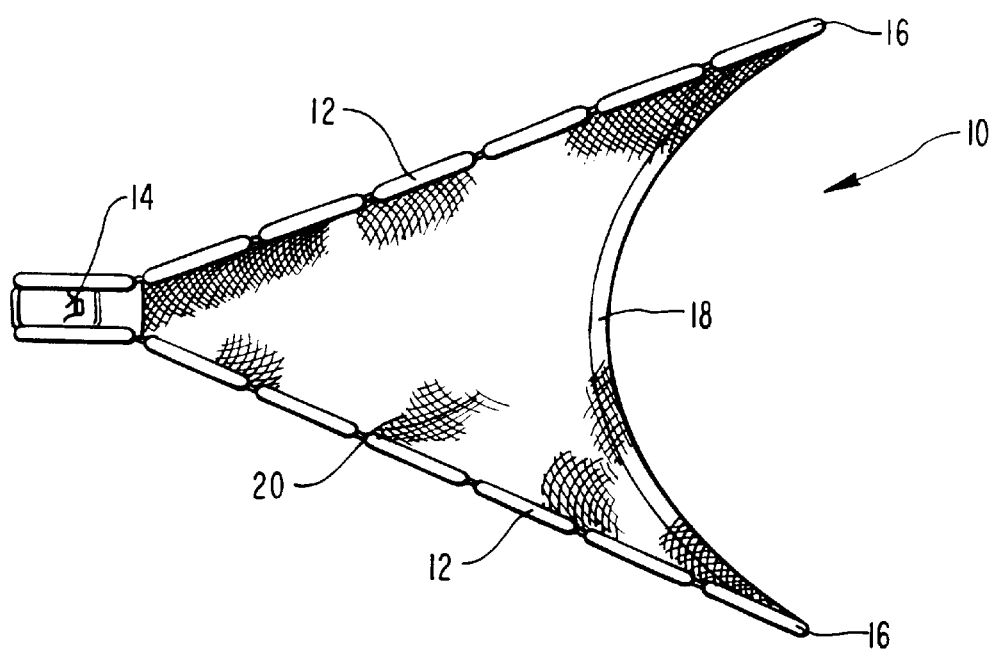
FIG. 1A is a plan view of a boom system used in conjunction with the present invention.

Referring first to FIG. 1A, one embodiment of a means for concentrating aquaculture is illustrated. A trawl 10 is shown having two booms 12 connected to an aperture box 14 and extending outwardly therefrom. Each of boom 12 have a deployed end 16 to which a lead line 18 is attached. Lead line 18 serves to hold deployed ends 16 together to form a generally triangular form to the plan view of trawl 10. Lead line 18 is comprised of a flexible yet heavy material such as steel cable so that the lower edge of a fabric 20 is held submerged below the surface of the water while booms 12 remain floating on the surface. Lead line 18 thereby forms a leading edge of fabric 20.

Figure 1B:
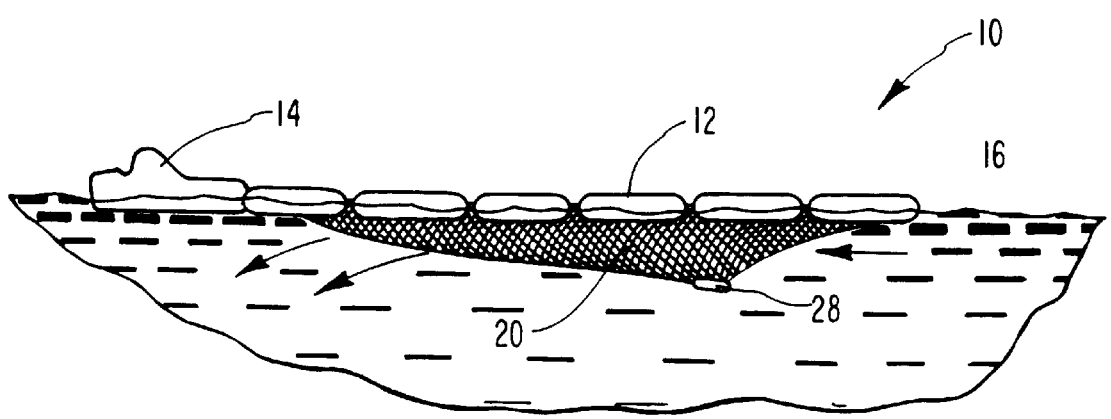
FIG. 1B is an elevational view of the boom section presented in FIG. 1A.

Turning now to FIG. 1B, the purpose of lead line 18 can be better visualized. In the embodiment illustrated in FIG. 1B, trawl 10 is designed for harvesting aquaculture present in the first few feet below the surface of the water. The aquaculture present within the first few feet below the surface of a body of water often comprises a variety of different types of aquaculture. Such aquaculture can include, by way of example and not by limitation, brine shrimp, brine shrimp roe, jelly fish, and plants such as seaweed. The present invention discloses methods and apparatus in which a selected species is harvested from the general mixture of aquaculture.

Returning to FIG. 1B, any organism that enters over lead line 18 will be forced by the flow of water to travel up fabric 20 into aperture box 14. Fabric 20 is a porous material having a pore size designed to allow water to pass therethrough, but preventing the passage of the aquaculture to be harvested.

In one embodiment, to be discussed later in greater detail, a device for moving water is placed near aperture box 14 to create a flow of water toward aperture box 14. The aquaculture is thereby concentrated in aperture box 14 and may be harvested therefrom. It will be appreciated, however, that in some applications it may be preferable to merely propel the ship in a forward motion to create the same current driving the aquaculture into aperture box 14.

For example, in one embodiment of the present invention, a vessel is designed so that the front of the vessel may be slightly submerged, the bow of the vessel having a shape capable of funneling the aquaculture directly in front of the bow into an aperture from which they may be harvested. Likewise, booms 12, although comprised of a buoyant flexible material in the illustration shown in FIGS. 1A and 1B, may also be of a rigid buoyant material or of a nonbuoyant material which is suspended from the ship. The overall size of trawl 10 may also be varied depending upon the species being harvested. In the embodiments in which trawl 10 is propelled forward, the pore size may be enlarged so that sufficient water will flow through trawl 10.

Figure 2:
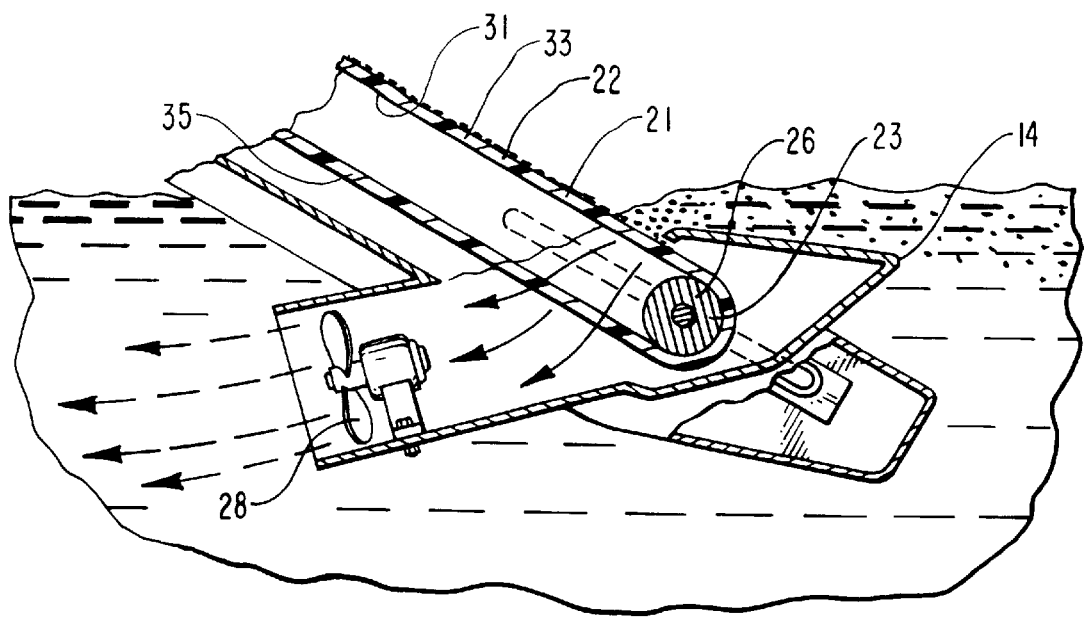
FIG. 2 is a cross-sectional side view of a lower portion of the belt system partially emerged in water.

After the aquaculture has been concentrated in aperture box 14, the aquaculture is lifted out of the water and placed in a settling compartment. To accomplish this, extraction means for continuously removing a portion of the aquaculture from near the surface of the body of water are provided. In the embodiment illustrated in FIGS. 2 and 3, the extraction means comprise a first conveyor system 21 having a first end 23 and an opposing second end 25. Rollers 24 and 26 are respectively positioned at opposing ends 23 and 25. A continuous moveable belt 22, rotates between rollers 24 and 26 and is powered by a conventional motor (not shown). Belt 22 comprises an upper stretch 33 extending between first end 23 and second end 25 and also a lower section 35 positioned below upper section 33 and also extending between first end 23 and second end 25. Of course, as belt 22 rotates, the portion of belt 22 making up upper stretch 33 and lower stretch 35 continually changes.

The aquaculture is fed onto belt 22 as belt 22 rotates. A propeller 28 mounted on the backside of belt 22 creates a flow of water that concentrates the aquaculture within aperture box 14 and forces the aquaculture onto belt 22. Although propeller 28 is utilized in this embodiment, any of the known means for propulsion such as jet nozzles or the motion of the vessel in a forward direction can create the appropriate flow to force the aquaculture onto belt 22.

At first end 23 of first conveyor 21, the path of belt 22 is guided around roller 24. Belt 22 then continues to move until it is guided around roller 26 at second end 25 of first conveyor 21. Rollers 24 and 26 are journaled on an axle 27 supported by and extending between side plates 29 of first conveyor system 21. The width of belt 22 varies depending on the species being harvested and on the methods utilized for creating the current against belt 22. When the harvesting is completed, the entire first conveyor system 21 may be removed from the water so that the ship may return to shore without the drag of belt 22 being in the water. This also helps prevent damage to belt 22 and aperture box 14.

The tension on belt 22 is maintained by a hydraulic piston and cylinder as is well known in the art. Preferably, continuous belt 22 is driven by a hydraulic motor through a chain and sprocket drive. The direction of drive is such that upper stretch 33 of belt 22 moves upwardly out of the water.

Figure 3:
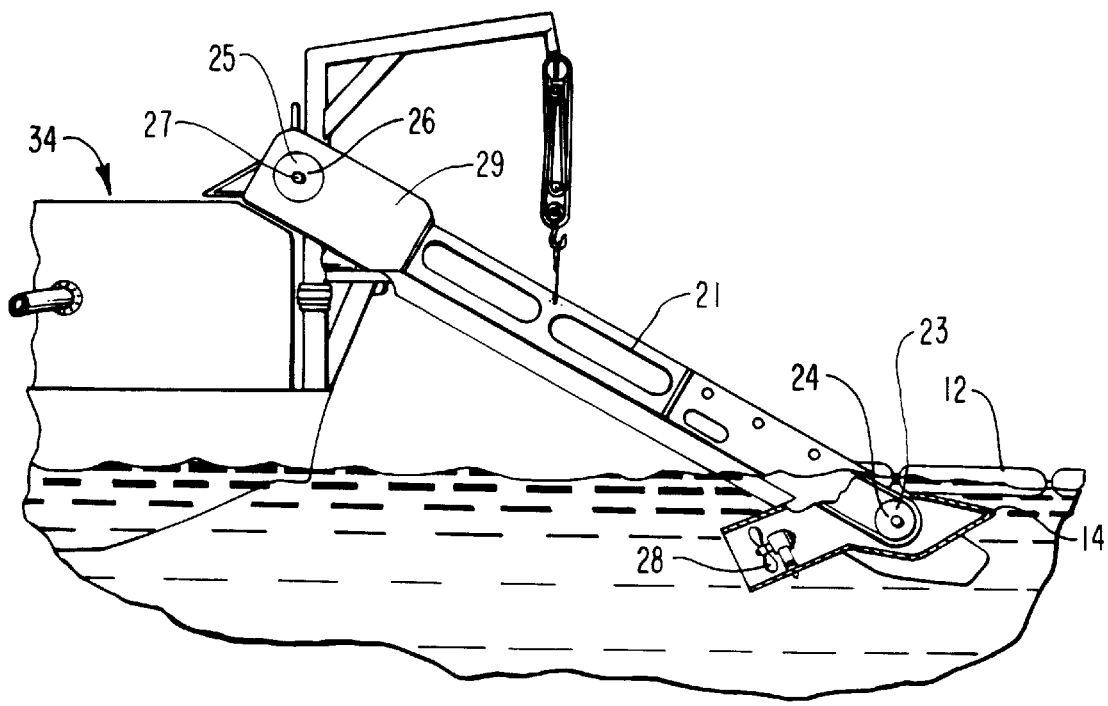
FIG. 3 is a side view of the belt system.
Figure 4:
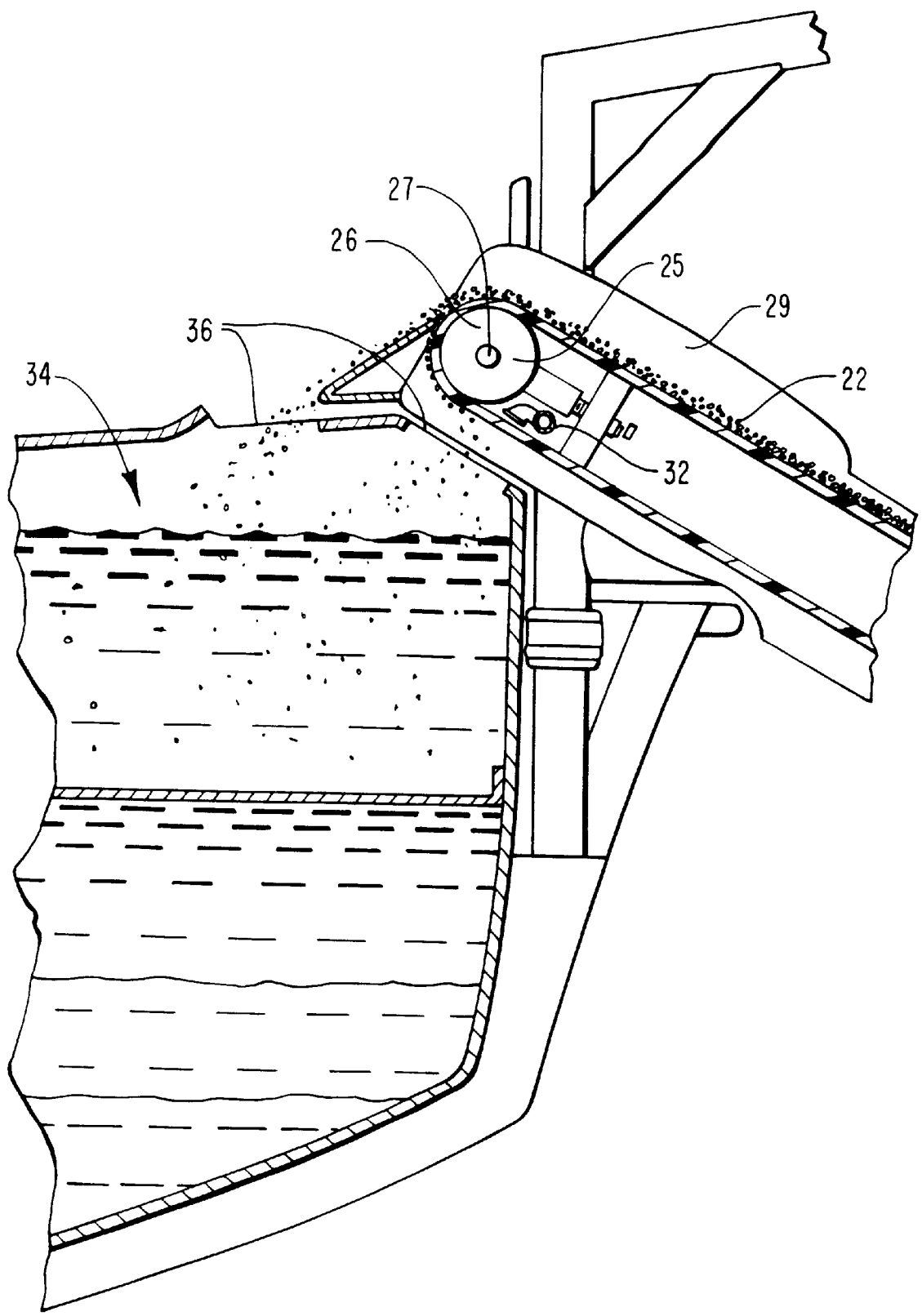
FIG. 4 is an elevational view of the upper portion of the belt system particularly demonstrating the spray bar.

During operation, as shown in FIGS. 3 and 4, the aquaculture forced against belt 22 are carried upwardly on belt 22 and are deposited in a settling compartment 34. As the aquaculture moves upwardly on belt 22, most of the water is removed by draining off, down, or through belt 22. In the embodiment where brine shrimp roe are being harvested, belt 22 is made of aramid or kevlar and is covered with a number 110 sized silk screen pad to aid in holding the roe. Other belt covers may be developed to assist in holding other aquaculture. In one embodiment, it is preferred that belt 22 have a plurality of pores 31 extending therethrough. Pores 31 preferably have a size smaller than the species selected for harvesting so as to assist in removal of the water without loss of the selected species. By initially removing the water, the amount of material that must be processed is substantially reduced.

As can be seen more clearly in FIG. 3, settling compartment 34 is shown located below the second end 25 of belt 22. Although some aquaculture will fall off belt 22 when belt 22 is inverted and begins its downward path, many smaller forms of aquaculture must be forcefully removed from belt 22. To accomplish this, a spray bar 32 is placed between upward stretch 33 and lower stretch 35 of belt 22 and is positioned so as to spray water through lower stretch 35.

The term "spray bar" as used in the specification and appended claims is intended to include all conventional nozzles, spigots, faucets, sprinklers and the like used either singularly or in a plurality to spray water or other liquids. It is also envisioned, however, that the "spray bar" can be used to blow a gas such as air. As a result of the sprayed water from spray bar 32, any aquaculture embedded in or held upon belt 22 will be removed from belt 22 and will fall into settling compartment 34.

Turning now to FIG. 4, a more detailed view is presented of the path through which the aquaculture is moved after the aquaculture have been removed from belt 22. Although one settling compartment 34 is shown in the illustration, for larger operations or operations involving small organisms which take longer to settle, it may be preferred to have an intermediary compartment which is selectively pumped into several settling compartments. In this manner harvesting can continue while the contents of several compartments are settling.

In one embodiment, the present invention also provides for screening means positioned to receive the aquaculture from the extraction means for continuously separating at least a portion of the selected species from the aquaculture. By way of example and not by limitation, FIG. 5 discloses a second conveyor system 46 having a first end 48 and an opposing second end 50. Rollers 52 and 54 are respectively positioned at opposing ends 48 and 50. A continuous moveable belt 56, rotates between rollers 52 and 54 and is powered by a conventional motor. As with belt 22, belt 56 is also separated into an upper stretch 57 and a lower stretch 59. The remaining structural components for operating second conveyor system 46 are similar to those discussed with regard to first conveyor system 21 and are well known to those in the art.

Second conveyor system 46 is positioned such that first end 48 is positioned below second end 25 of first conveyor system 21. In this configuration, as the aquaculture passes over roller 26 of first conveyor system 21, the aquaculture drops onto belt 56 of second conveyor system 46. To assist in removing the aquaculture from belt 22, a scraper 61 can be biased against belt 22 at second end 25. Furthermore, spray bar 32 can also be used for knocking the aquaculture off belt 22 and onto belt 56.

Belt 56 is designed having a plurality of pores 58 that are slightly larger than the selected species to be removed from the aquaculture. During use, the selected species fall through pores 58 in belt 56 and drop into settling compartment 34. The remaining aquaculture that is larger than pores 58 remains on belt 56 and is conveyed to second end 50. As belt 56 rotates around roller 54 at second end 50, the remaining aquaculture falls from belt 56 and is collected in a compartment 51. In an alternative embodiment, the remaining aquaculture is directly discarded back into the body of water. As disclosed in FIG. 5, a spray bar 60 can also be positioned between upper stretch 57 and lower stretch 59 at second end 50 of belt 56 so as to remove all remaining aquaculture from belt 56.

Figure 5:
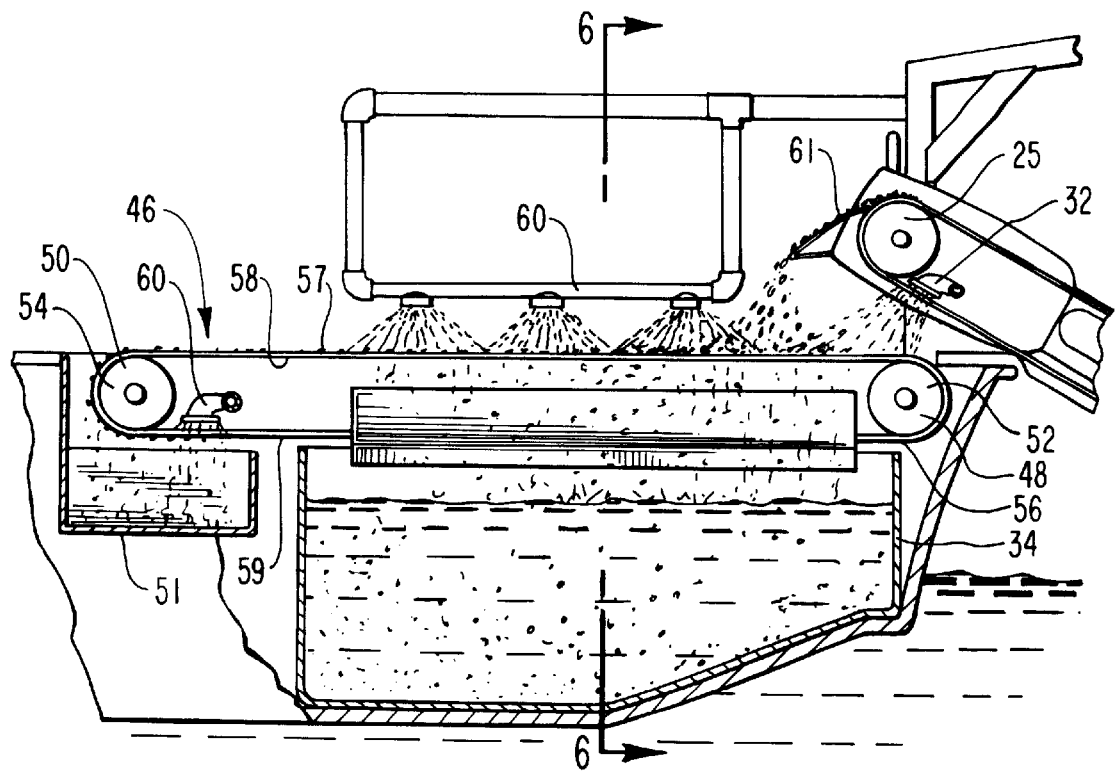
FIG. 5 is a cross-sectional side view of a conveyor system used to initially separate the selected species from the aquaculture.

As also shown in FIG. 5, an exposed spray bar 62 can be mounted above belt 56. The water from spray bar 62 combines with the aquaculture on belt 56 to help dilute the aquaculture and allow the selected species to freely filter through pores 58 in belt 56.

Figure 6:
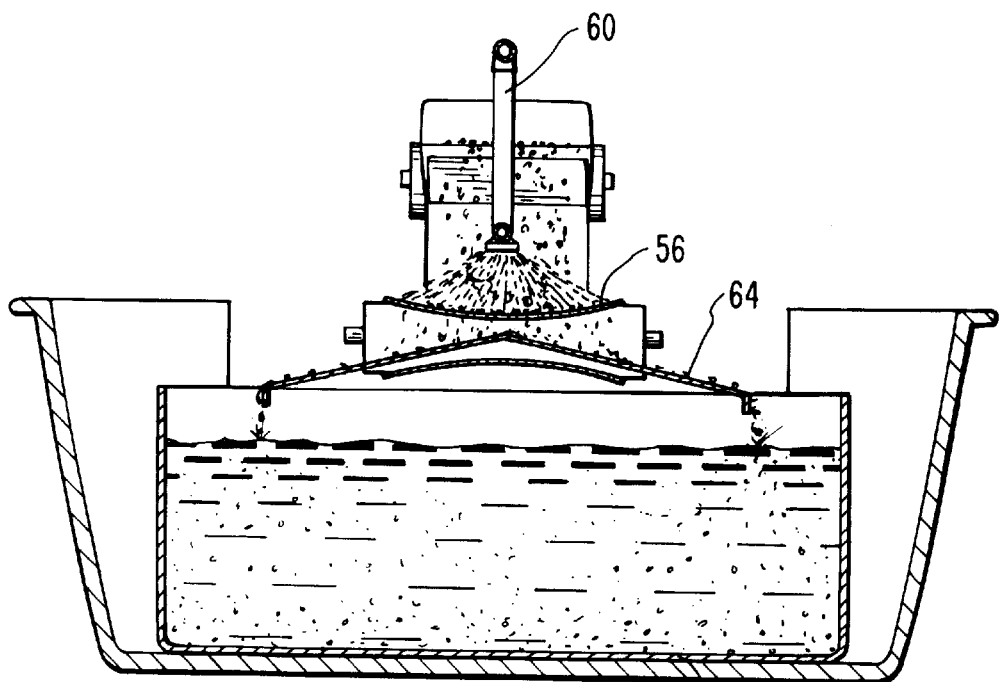
FIG. 6 is an end view of the conveyor system shown in FIG. 5.

In one embodiment, as shown in FIG. 6, belt 56 can have a concave surface to assist in containing and diluting the aquaculture on belt 56. Furthermore, a shield 64 can be positioned to extend between upper section 57 and lower section 59 of belt 56. Shield 64 is selectively positioned so that as the selected species passes through pores 58 in upper section 57, the selected species fall onto shield 64 and then slide into settling compartment 34. Thus, the use of shield 64 prevents the selected species from falling and getting caught on the descending portion 59 of belt 56.

Figure 7:
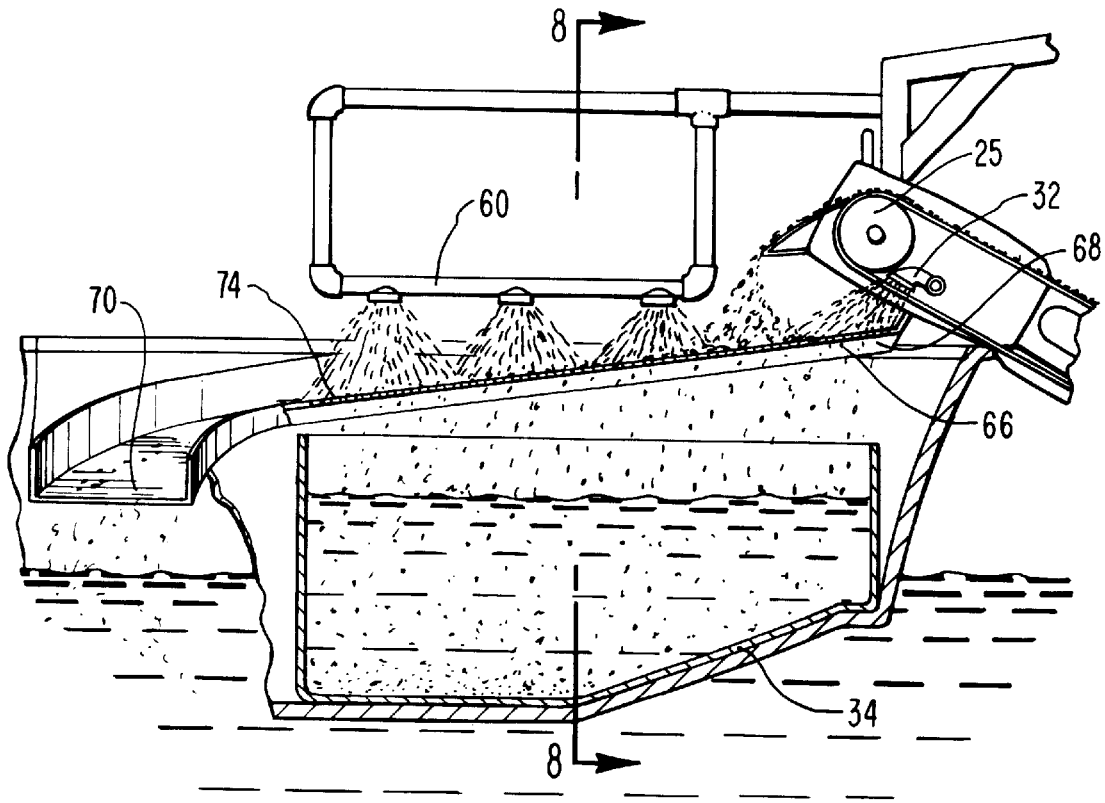
FIG. 7 is a cross-sectional side view of the table used to separate the selected species from the aquaculture.
Figure 8:
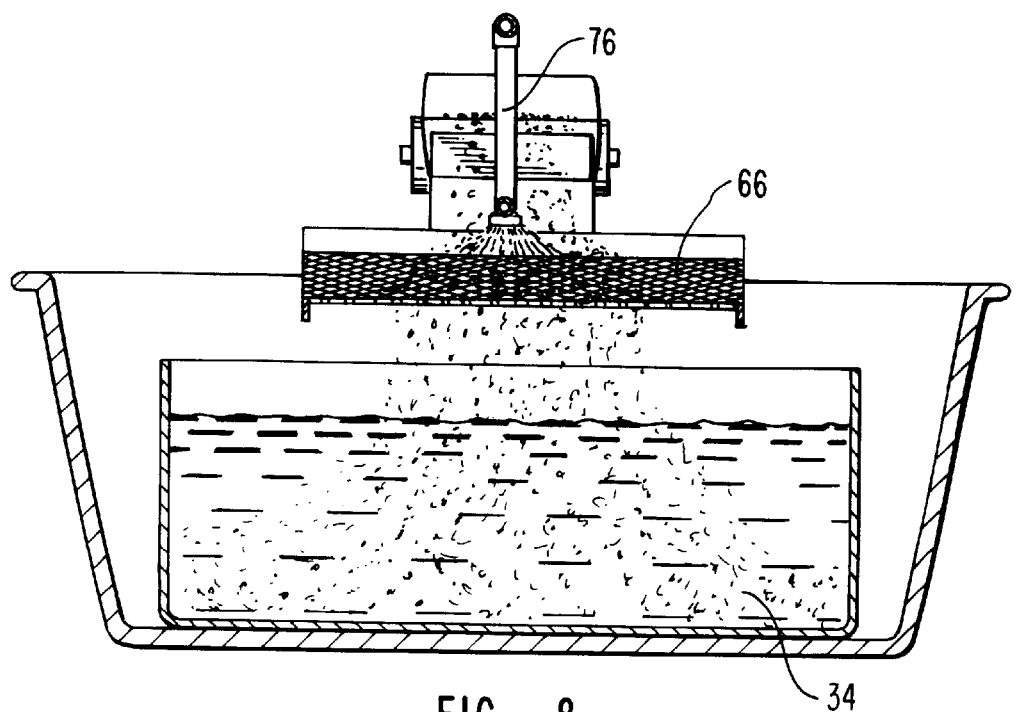
FIG. 8 is a cross-sectional end view of the table shown in FIG. 7.

An alternative embodiment for the filtering means is shown in FIGS. 7 and 8. As disclosed therein, the filtering means can also comprise a table 66 spanning settling compartment 34 and extending between a first end 68 and a second end 70. As with belt 56, first end 68 of table 66 is housed below second end 25 of belt 22. Accordingly, as the aquaculture rotates around second end 25 of belt 22, the aquaculture falls onto table 66. As previously discussed, spray bar 32 can be selectively positioned to remove any remaining aquaculture from belt 22 and deposit it on table 66.

In one embodiment, table 66 is slightly angled so that the aquaculture naturally runs from first end 68 to second end 70. Table 66 preferably has a smooth surface with a plurality of pores 74 extending therethrough. Pores 74 have a size slightly larger than the selected species to be harvested from the aquaculture. As such, the selected species pass through pores 74 and fall into settling compartment 34.

To assist in this filtration process, spray bar 60 is mounted above table 66 and sprays water thereon. The water helps to filter the selected species through pores 74 and assists in transferring the remaining portion of the aquaculture to the second end 70 of table 56. To further assist in separation of the selected species from the aquaculture, the table can also be selectively vibrated. Once the remaining aquaculture reaches second end 70 of table 56, the aquaculture is either captured or, as shown in FIG. 7, returned to the body of water.

Using the same general concepts as discussed above, the present invention also envisions using a plurality of tables or belts having consecutively different sized pores for filtering out a selected species from the body of aquaculture. For example where the selected species has a relatively large size, for example jelly fish, it may be preferred to initially pass the jelly fish over a belt having pores slightly smaller than the jelly fish. This removes the aquaculture smaller than the jelly fish. The jelly fish and larger aquaculture are then passed onto a second belt having pores slightly larger than the jelly fish. The jelly fish then pass through the enlarged pores so as to separate the jelly fish from the larger aquaculture.

The present invention also envisions that a plurality of selected species can be simultaneously harvested and separated. By way of example an not limitation, the present invention also discloses second extraction means for continuously removing a portion of the aquaculture from the compartment receiving the aquaculture from the screening means. The second extraction means includes, by way of example, first conveyor system 21 as discussed with regards to FIGS. 2–5. The main distinction is that first end 23 is positioned within compartment 51 to continuously remove the aquaculture contained therein for further processing.

The present invention also discloses a second screening means positioned to receive the aquaculture from the second extraction means for continuously separating at least a portion of the selected species from the aquaculture. By way of example, the second screening means includes second conveyor system 46 and table 66 as previously discussed with regard to FIGS. 5–8. The main distinction is that second conveyor system 46 and table 66 are now used to receive and separate aquaculture from the second extraction means.

To illustrate by way of example, second continuous belt 56 can have relatively small pores 58 to allow selected species such as brine shrimp roe to pass into settling compartment 34. The remaining larger aquaculture then passes into compartment 51. A third conveyor system, configured like first conveyor system 21, removes the aquaculture from compartment 51 on a third continuous belt.

Next, a fourth conveyor system, substantially configured like second conveyor system 46, receives the aquaculture from the third conveyor system. The fourth continuous belt can have pores of a larger size to enable larger selected species, such as jelly fish to pass through the fourth conveyor system and into a settling compartment. The remaining larger aquaculture continuous along the fourth continuous belt either to be disposed of or to be processed through yet another set of conveyor and filtering belts.

It is also envisioned that rather then having the third conveyor system removing aquaculture from compartment 51, third conveyor system could remove aquaculture from settling compartment 34 for subsequent processing and separation of the aquaculture contained therein.

Finally, the present invention also provides for transporting means for conveying the aquaculture. In dry land processing, the aquaculture may or may not be stored in a body of water. For example, the aquaculture may initially be stored in a substantially dry condition or it may not be stored at all but rather be directly processed as it is brought in from the body of water. For any of the above scenarios, however, a transporting means is required to initially transport the aquaculture to the screening means. As such, the transporting means includes first conveyor system 21 but also includes, by way of example and not by limitation, structures such as conventional conveyor belts, slides or shoots, and hoses or pipes used with conventional pumps.

Figure 9:
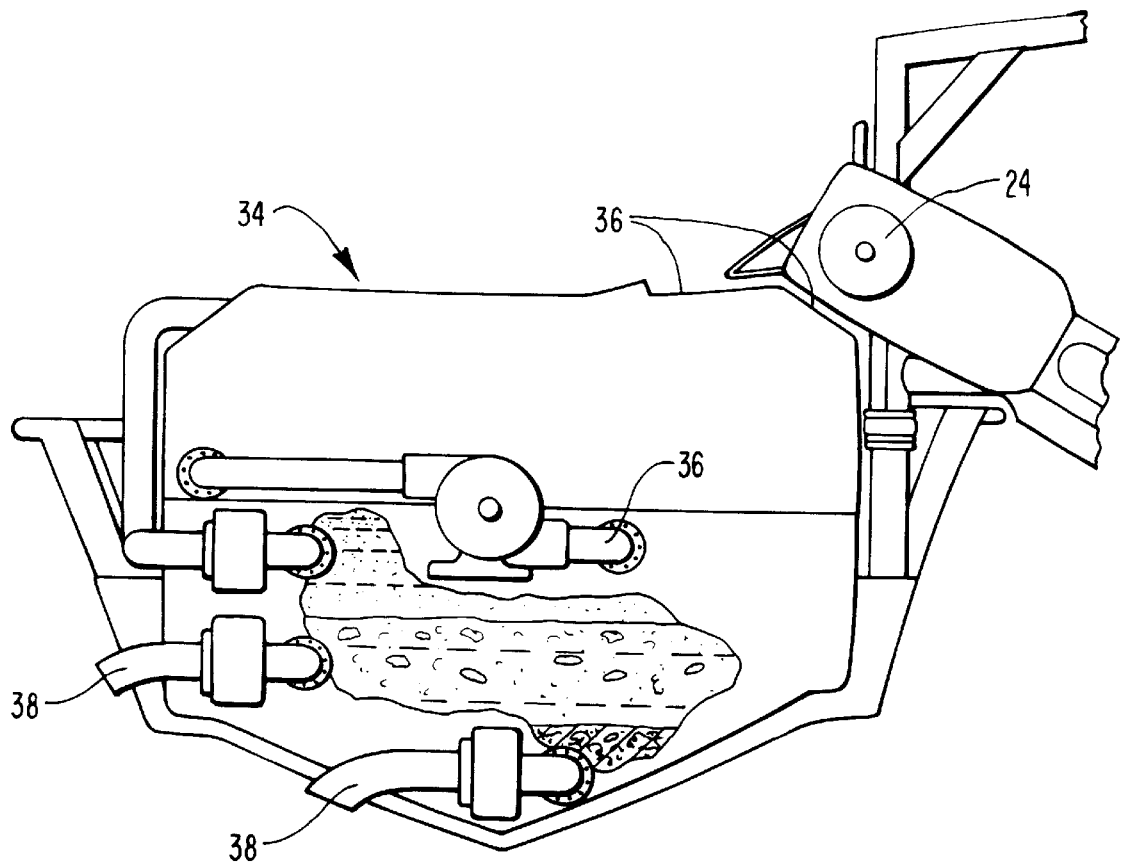
FIG. 9 is a cross-sectional view of a compartment into which the aquaculture sprayed from the belt by the spray bar in FIG. 4 are contained.

Turning now to FIG. 9, settling compartment 34 is depicted as having an inlet 36 and several exits 38. Depending on the species being harvested, any of exits 38 may be utilized to skim the settled contents of settling compartment 34. For example, the brine shrimp roe floating on the surface would be pumped through the upper most of exits 38 to another compartment of the ship for storage or for processing. The lower most of exits 38 could then be used to drain the compartment and eject the material overboard in preparation of the refilling of the compartment for settling of further harvest.

Figure 10:
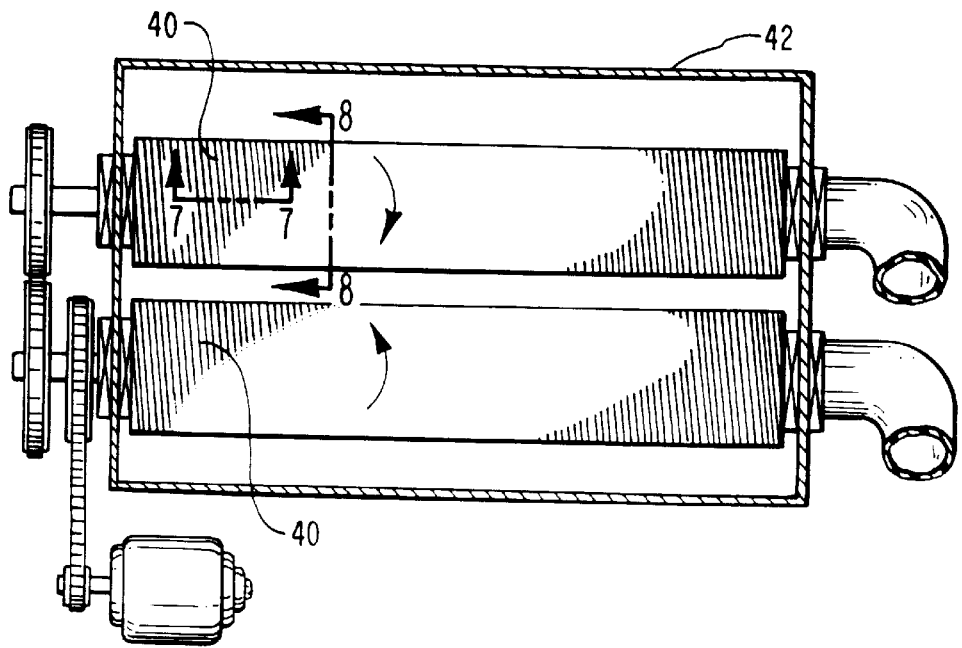
FIG. 10 is a plan view of one embodiment of the filtering means.

FIG. 10 is a plan view of one embodiment of a means for filtering utilized in the present invention. In the embodiment depicted in FIG. 10, the means for filtering comprise two elongate filter tubes 40 housed within a filter tank 42. Filter tubes 40 are suspended at each end in filter tank 42 with bearing surfaces to allow tubes 40 to rotate within tank 42. One end of each of filter tubes 40 is opened and is sealed into an opening into the side of filter tank 42 to allow water and aquaculture which collect inside of tube 40 to pass through tube 40 and to be stored in a separate compartment.

In use, filter tank 42 is filled until filter tubes 40 are submerged. Filter tube 42 is counter-rotated within filter tank 42. Filter tube 42 is constructed of a closely spaced wire mesh which serves to allow the passage of water and the selected species of the aquaculture therethrough. Upon entering the inside of tubes 40, the selected species and water flow to the end and leave filter tank 42. Any material in filter tank 42 which is of a size too large to pass through filter tube 40 will remain in the tank and then can be pumped overboard.

It will be appreciated that although the embodiment illustrated in FIG. 10 utilizes two filter tubes 40, any number of filter tubes 40 may be utilized depending upon the species to be harvested. Likewise, the spacing between fins or mesh on the filter tube 40 can be varied depending on the species. In the embodiment illustrated in FIG. 10, the fins or mesh are constructed with stainless steel which is resistance welded to a conduit passing through tube 40. The conduit has openings which allows the passage of water and organisms therethrough. Because of the pressure gradient developed from having a hollow tube with a fine mesh surrounding the tube, there is a gentle flow which develops from the outside of filter tank 42 to the inside of filter tubes 40. The pressure and rate of this flow may be modified by spacing spirally wound wire.

Figure 11:
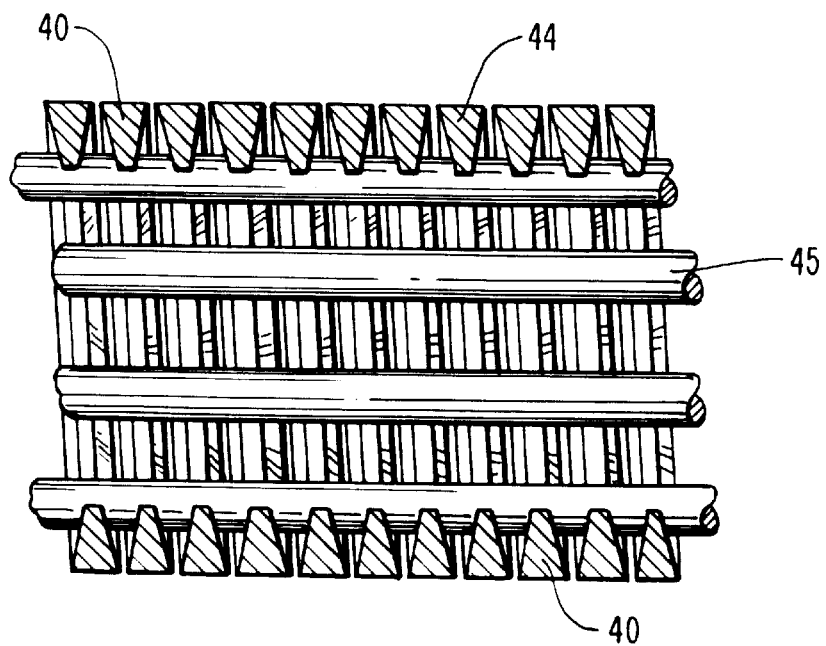
FIG. 11 is a cross-sectional elevational view of the embodiment of the filtering means shown in FIG. 6.

FIG. 11 is an elevational view of the filter tank shown in FIG. 10. Filter tubes 40 are counter rotated using any of the known mechanical means for rotating a tube such as a gear and a chain system attached to a hydraulic motor.

A formed wire 44 is wrapped in helical fashion around a series of rods 45 which extend the length of filter tube 40. A round wire which has been passed through a compressor is formed into generally triangular shaped wire 44 shown in FIGS. 10–12. As wire 44 is wound over longitudinal rods 45, wire 44 becomes resistance welded to rods 45 with the large end of the triangle being spaced apart from the next revolution of the wire an appropriate distance.

For example, when harvesting brine shmrmp roe, a spacing of approximately 15/1000 of an inch is utilized. For much of the material which is harvested, the spacing will be too small to penetrate and the material will remain in filter tank 42 to be pumped overboard. The material which is fine enough to pass through the spacing between the formed wires 44 or fins will enter filter tube 40 and pass out at the end of filter tube 40 into a compartment.

Figure 12:
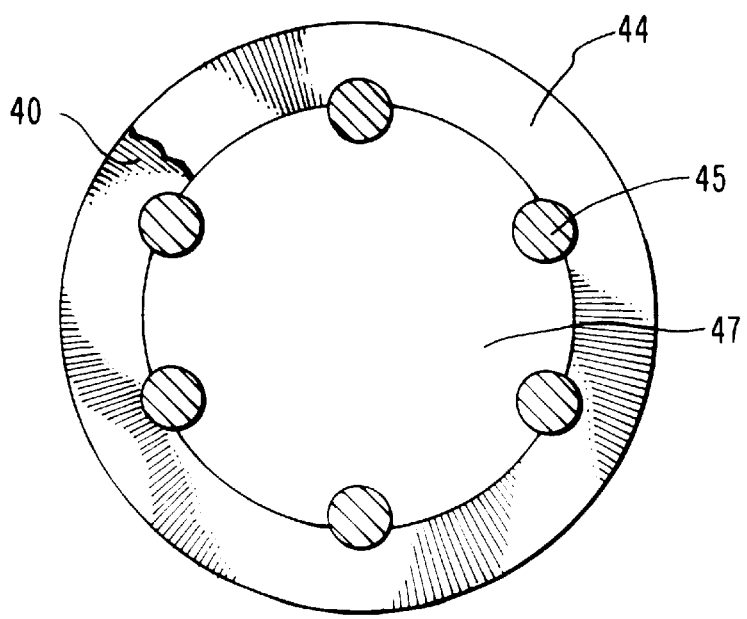
FIG. 12 is a cross-sectional end view of one of the filter.

FIG. 12 is a cross-sectional view of one of the filter tubes 40 illustrated in FIGS. 10 and 11. The cross-sectional view shows longitudinal rods 45, a hollow core 47, and formed wire 44.

Although the above disclosure is generally directed towards harvesting aquaculture in a body of water such as an ocean, sea, or lake, the same method and apparatus can be used for dry land processing of a selected aquaculture species. That is, by starting with a tank or other repository holding aquaculture, the above-described apparatus can be used for separating the selected species from the remaining portion of the aquaculture. Furthermore, by initially depositing the aquaculture directly onto first conveyor system 21 or second conveyor system 46, a selected species can be separated from an assortment of aquaculture without the need of any kind of holding facility.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Patent is:

1. An apparatus for separating a selected species from aquaculture harvested from a body of water the apparatus comprising:
    (a) extraction means for continuously removing a portion of the aquaculture from the body of water; and
    (b) a porous screen positioned to receive aquaculture harvested from the body of water and to separate at least a portion of the selected species from the aquaculture, wherein the porous screen comprises a plurality of pores extending therethrough, the pores being slightly larger then the selected species to allow the selected species to pass through the porous screen; and
    (c) a water source positioned adjacent to the porous screen to deposit water thereon and assist the selected species in passing through the, pores.

2. An apparatus as recited in claim 1, wherein the extraction means comprises a first conveyor system having a first continuous belt rotatable between a first end and an opposing second end of the conveyor system, the fist end being submersible within the body of water during rotation of the first continuous belt to receive and transport the aquaculture from the body of water on the first continuous belt.

3. An apparatus as recited in claim 2, wherein the first continuous belt has a plurality of pores extending therethrough, the pores being a size smaller than the selected species to substantially separate the water from the aquaculture.

4. An apparatus as recited in claim 2, further comprising a scraper biased against the first continuous belt to transfer the aquaculture from the first continuous belt to the screening means.

5. An apparatus as recited in claim 2, further comprising a spray bar selectively mounted to spray water against the aquaculture on the first continuous belt so as to knock the aquaculture onto the screening means.

6. An apparatus as recited in claim 1, wherein the porous screen comprises a second conveyor system having a second rotatable, continuous belt, the second continuous belt being positioned to receive the aquaculture from the extraction means, the second continuous belt having said plurality of pores extending therethrough.

7. An apparatus as recited in claim 6, further comprising a shield mounted between a upper stretch of the second continuous belt and a lower stretch of the second continuous belt, the shield deflecting the selected species from the lower stretch as the selected species passes through the pores in the upper stretch of the second continuous belt.

8. An apparatus as recited in claim 6, wherein the second continuous belt has a concave surface to hold the aquaculture.

9. An apparatus as recited in claim 1, further comprising:
    (a) a compartment for receiving the aquaculture from the porous screen;
    (b) second extraction means for removing a portion of the aquaculture from the compartment; and
    (c) second porous screen positioned to receive the aquaculture from the second extraction means for separating at least a portion of the selected species from the aquaculture.

10. An apparatus for harvesting a selected species from aquaculture found in a body of water near the surface of the body of water, the apparatus comprising:
    (a) a first conveyor system having a first continuous belt rotatable between a fist end and an opposing second end of the conveyor system, the fist end being submersible within the body of water during rotation of the first continuous belt to receive and transport the aquaculture from the body of water on the first continuous belt; and
    (b) a second conveyor system having a second rotatable, continuous belt, the second continuous belt being positioned to receive the aquaculture from the first continuous belt, the second continuous belt also having a plurality of pores extending therethrough, the pores being slightly larger then the selected species to allow the selected species to pass through the second continuous belt.

11. An apparatus as recited in claim 10, further comprising a shield mounted between an upper stretch of the second continuous belt and a lower stretch of the second continuous belt, the shield deflecting the selected species from the lower stretch as the selected species passes through the pores in the upper stretch of the continuous belt.

12. An apparatus as recited in claim 10, wherein the second continuous belt has a concave surface to hold the aquaculture.

13. An apparatus as recited in claim 10, further comprising a spray bar positioned adjacent to the second continuous belt to deposit water thereon, the water diluting the aquaculture on the second continuous belt and assisting the selected species in passing through the pores.

14. An apparatus as recited in claim 10, further comprising a spray bar selectively mounted to spray water against the aquaculture after the selected species has been separated therefrom, the water from the spray bar removing the remaining aquaculture from the continuous belt.

15. An apparatus as recited in claim 10, further comprising a compartment for receiving the aquaculture from the second conveyor system.

16. An apparatus as recited in claim 15, wherein the compartment is positioned to receive the aquaculture that passes through the second continuous belt.

17. An apparatus as recited in claim 15, wherein the compartment is positioned to receive the aquaculture that does not pass through the second continuous belt.

18. An apparatus as recited in claim 15, further comprising:
   a third conveyor system having a third continuous belt rotatable between a first end and an opposing second end of the third conveyor system, the first end being submersible with the compartment receiving the aquaculture from the second conveyor system, the third continuous belt receiving and transporting the aquaculture from the first end to the second end of the third conveyor system; and
   a fourth conveyor system having a fourth rotatable, continuous belt, the fourth continuous belt being positioned to receive the aquaculture from the third continuous belt, the fourth continuous belt also having a plurality of pores extending therethrough, the pores being slightly larger than the selected species to allow the selected species to pass through the fourth continuous belt.

19. A device for separating viable brine shrimp cysts from an as harvested slurry thereof containing foreign materials, said device comprising:
   an endless strip of flexible fine mesh screen;
   means forming said screen into a closed loop having a substantially horizontal uppermost portion and a generally horizontal lowermost portion;
   means powering the strip into continuous motion along said loop;
   means for depositing as harvested shrimp cyst slurry upon the horizontal uppermost surface of the moving fine mesh screen;
   means for providing a generally continuous flow of water downwardly onto the shrimp slurry upon the horizontal uppermost portion of the screen; and
   an upwardly opening pan disposed beneath the uppermost horizontal portion of the screen to collect water and cysts flowing downwardly through the screen.

20. A device for separating viable brine shrimp cysts from an as harvested slurry thereof containing foreign materials, said device comprising:
   an endless strip of flexible fine mesh screen;
   means forming said screen into a closed loop having a substantially horizontal uppermost portion and a generally horizontal lowermost portion;
   means powering the strip into continuous motion along said loop;
   means for depositing as harvested shrimp cyst slurry upon the horizontal uppermost surface of the moving fine mesh screen;
   means for providing a generally continuous flow of water downwardly onto the shrimp slurry upon the horizontal uppermost portion of the screen;
   an upwardly opening pan disposed beneath the uppermost horizontal portion of the screen to collect water and cysts flowing downwardly through the screen; and
   wherein the means providing a flow of water onto the slurry comprises at least one water conduit secured to the frame, terminating in at least one spray nozzle positioned to discharge downwardly upon the slurry on the horizontal uppermost portion of the screen, said conduit having an inlet adapted for connection to a source of pressurized water.

21. A device for separating brine shrimp eggs from an as-harvested mixture of said eggs and foreign material from a body of water, the device comprising:
   screening means to separate the eggs from the mixture, said means receiving the mixture directly from a harvesting means removing said mixture from the water;
   wherein the screening means is carried by a shrimp egg harvesting vessel, and said screening means comprises;
   an endless strip of flexible fine mesh screen;
   means forming said screen into a closed loop having a substantially horizontal uppermost portion and a generally horizontal lowermost portion;
   means powering the strip into continuous motion along said loop;
   means for providing a generally continuous flow of water downwardly onto the mixture of eggs and foreign material upon the horizontal uppermost portion of the screen;
   upwardly opening pan means disposed beneath the uppermost horizontal portion of the screen to collect water and eggs flowing downwardly through the screen.

22. A method for harvesting brine shrimp roe disposed in a mixture of brine shrimp roe, brine shrimp, and detritus from a body of water, said method comprising the steps of:
   collecting said mixture from said body of water;
   transporting said collected mixture to a screening assembly;
   substantially separating solid brine shrimp roe from brine shrimp and detritus in said mixture at said screening assembly; and
   delivering said separated brine shrimp roe to at least one container.

23. A method for harvesting brine shrimp roe as defined in claim 22, wherein the at least one container is porous.

24. A method for harvesting brine shrimp roe as defined in claim 22, wherein the at least one container is a settling compartment located in a harvesting vessel.

25. A method for harvesting brine shrimp roe as defined in claim 22, wherein the screening assembly is located on a vessel floating on the body of water.

26. An apparatus for separating brine shrimp roe from a mixture of brine shrimp roe, brine shrimp, and detritus harvested from a body of water comprising:
   a conveyor system having a rotatable, continuous belt configured to receive the harvested mixture thereon, the continuous belt having a plurality of pores extending therethrough, the pores being slightly larger than the brine shrimp roe to allow the brine shrimp roe to pass through the continuous belt, the conveyor system being disposed on or adjacent the body of water; and
   a water source positioned adjacent to the continuous belt to deposit water thereon and assist the brine shrimp roe to pass through the pores.

27. An apparatus for separating brine shrimp roe as defined in claim 26, wherein the conveyor system is disposed on a vessel floating on the body of water.

28. An apparatus for harvesting brine shrimp roe disposed in a mixture of brine shrimp roe, brine shrimp, and detritus from a body of water, said apparatus comprising:

a floating vessel;

a collection assembly for collecting said mixture, said collection assembly being associated with said floating vessel;

a screening assembly, associated with said floating support member, providing means for substantially separating said brine shrimp roe from brine shrimp and detritus in said mixture;

extraction means for transporting said mixture collected by said collection assembly to said screening assembly;

at least one container associated with said floating support member; and a delivery system for delivering said separated brine shrimp roe from said screening assembly to said container.

29. An apparatus for harvesting brine shrimp roe as defined in claim 28, wherein the at least one container is porous.

30. An apparatus for harvesting brine shrimp roe as defined in claim 28, wherein the at least one container is a settling compartment located in a harvesting vessel.

* * * * *